H. A. BELL & C. SWOBODA.
CLUTCH FACING.
APPLICATION FILED DEC. 8, 1916.
1,239,864.
Patented Sept. 11, 1917.
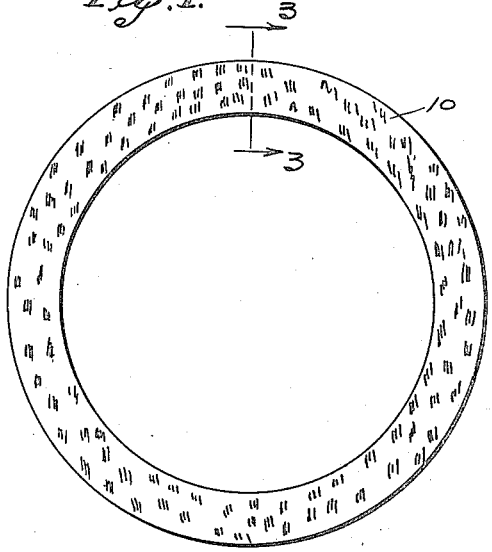
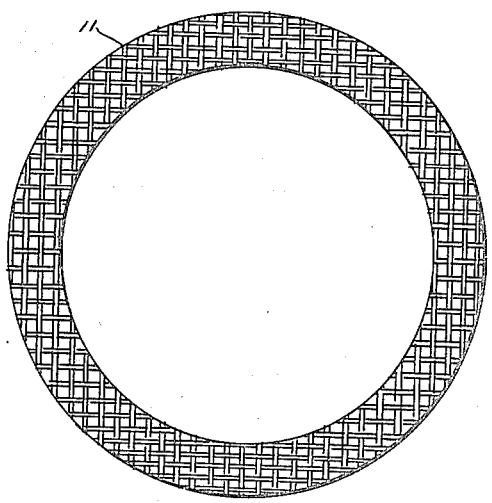
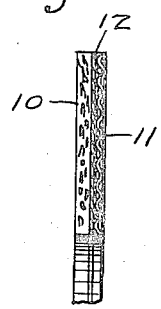
INVENTORS
Harry A. Bell and
Charles Swoboda
BY
Lockwood & Lockwood
ATTORNEYS

UNITED STATES PATENT OFFICE.

HARRY A. BELL AND CHARLES SWOBODA, OF INDIANAPOLIS, INDIANA, ASSIGNORS TO HIDE, LEATHER & BELTING COMPANY, OF INDIANAPOLIS, INDIANA, A CORPORATION.

CLUTCH-FACING.

1,239,864.      Specification of Letters Patent.      Patented Sept. 11, 1917.

Application filed December 8, 1916. Serial No. 135,781.

*To all whom it may concern:*

Be it known that we, HARRY A. BELL and CHARLES SWOBODA, citizens of the United States, and residents of Indianapolis, county of Marion, and State of Indiana, have invented a certain new and useful Clutch-Facing; and we do hereby declare that the following is a full, clear, and exact description thereof, reference being had to the accompanying drawings, in which like letters refer to like parts.

The object of this invention is to produce a suitable substitute for leather or asbestos lining to be used as a facing for disk clutches.

The chief feature of the invention lies in the combination of two materials which will combine a frictional surface with a surface of tensile strength so that the combination of the materials will serve the same functions as the material used in the present construction of clutch facing and be manufactured at a greatly reduced cost.

The full nature of the invention will be understood from the accompanying drawings and the following description and claims.

In the drawings, Figure 1 is a plan view of the frictional facing. Fig. 2 is a plan view of the fabric facing. Fig. 3 is a section on the line 3—3 of Fig. 1.

There is shown herein an annular disk clutch facing having a surface 10 of cork, which material has a high frictional coefficient, but is brittle and has no tensile strength. There is a thickness of cloth fabric 11 having great tensile strength secured to the layer or facing of cork by cement 12, or other suitable adhesive material.

The combination of the materials above described will afford a suitable substitute for leather or asbestos lining, in that it has the properties of friction and strength, and at the same time the manufacturing cost will be greatly reduced.

The invention claimed is:

1. A disk clutch facing including a body formed of cork, a fabric facing, and means for securing said fabric facing to said cork body.

2. A disk clutch facing including a body formed of cork, a fabric facing, and cement applied between said fabric and cork for securing the two materials together.

3. A disk clutch facing including an annular body formed of cork, a thickness of fabric, and cement applied between said fabric and cork for securing them together so that they will be substantially as one piece.

In witness whereof, we have hereunto affixed our signatures.

HARRY A. BELL.
CHARLES SWOBODA.